(12) United States Patent
Li

(10) Patent No.: US 9,463,837 B1
(45) Date of Patent: Oct. 11, 2016

(54) TRICYCLE

(71) Applicant: JIN CHANG SHENG INTERNATIONAL CO., LTD., Taichung (TW)

(72) Inventor: Ming-Jhang Li, Taichung (TW)

(73) Assignee: JIN CHANG SHENG INTERNATIONAL CO., LTD., Taichung (TW)

( * ) Notice: Subject to any disclaimer, the term of this patent is extended or adjusted under 35 U.S.C. 154(b) by 0 days.

(21) Appl. No.: 14/953,412

(22) Filed: Nov. 29, 2015

(51) Int. Cl.
| B62K 5/06 | (2006.01) |
| B62K 21/22 | (2006.01) |
| B62K 23/06 | (2006.01) |
| B62K 5/00 | (2013.01) |

(52) U.S. Cl.
CPC .............. B62K 5/06 (2013.01); B62K 21/22 (2013.01); B62K 23/06 (2013.01); *B62K 2005/001* (2013.01); *B62K 2201/04* (2013.01)

(58) Field of Classification Search
CPC ........ B62K 5/06; B62K 21/22; B62K 23/06; B62K 2005/001; B62K 2201/04
USPC ....... 280/263, 270, 282, 264, 271, 259, 260, 280/261, 262, 268, 827, 828
See application file for complete search history.

(56) References Cited

U.S. PATENT DOCUMENTS

| 3,429,584 | A | * | 2/1969 | Hendricks | B62K 3/005 188/5 |
| 4,198,072 | A | * | 4/1980 | Hopkins | B62K 3/005 280/259 |
| 4,283,070 | A | * | 8/1981 | Forrestall | B62K 21/18 280/220 |
| 4,778,192 | A | * | 10/1988 | McElfresh | B62K 3/005 280/226.1 |
| 5,069,469 | A | * | 12/1991 | Rosengrant | B62K 3/005 280/259 |
| 5,568,935 | A | * | 10/1996 | Mason | B62K 3/005 280/266 |
| 2012/0043737 | A1 | * | 2/2012 | Bricker | B62K 9/02 280/282 |
| 2013/0049321 | A1 | * | 2/2013 | Hadzicki | B62K 3/005 280/240 |

* cited by examiner

*Primary Examiner* — Jacob Knutson

(57) ABSTRACT

A tricycle includes a frame, a front fork connected to the frame, two rear forks each comprising a shank connected to the frame and two prongs extending from the shank, a front wheel rotationally connected to the front fork, two rear wheels each rotationally connected to the prongs of a corresponding one of the rear forks, and a steering mechanism connected to a selected one of the rear forks. There is a distance between an axis of the shank of each of the rear forks and a vertical line in which a center of the corresponding rear wheel rests when the rear wheels are laid on the ground.

8 Claims, 7 Drawing Sheets

TRICYCLE

BACKGROUND OF INVENTION

1. Field of Invention

The present invention relates to a tricycle and, more particularly, to an inexpensive tricycle that includes only one directly steered rear wheel and a free rear wheel.

2. Related Prior Art

As disclosed in Taiwanese Patent Nos. M364645 and M366500, a tricycle includes a frame for supporting a front wheel and two rear wheels. The typical tricycle further includes a steering mechanism that includes a handlebar and two linkage units. Each of the linkage units connects a corresponding one of the rear wheels to the handlebar. However, the use of two linkage units inevitably renders the tricycle expensive.

U.S. Pat. No. 8,256,784 discloses a tricycle including a frame 102, a front wheel assembly 110, a front steering mechanism 120, two rear wheel assemblies 150 and at least one rear steering mechanism 470. The front steering mechanism 120 is adapted to steer the front wheel assembly 110. Each rear wheel assembly 150 includes a casing 151a (151b), a rear wheel 152a (152b), a rear wheel axle 153a (153b) and a coupling member 154a (154b). Each casing 151a (151b) holds a corresponding rear wheel axle 153a (153b) that supports a corresponding rear wheel 152a (152b). Each casing 151a (151b) is connected to an end 132 (134) of a crossbar 130 of the frame 102 via a corresponding coupling member 155a (155b). However, the rear casing 151a cannot smoothly follow the rear casing 151b if the rear steering mechanism 470 is only connected to the rear casing 151b since the axis of each coupling member 155a (155b) intersects the axis of the corresponding rear wheel axle 153a (153b).

The present invention is therefore intended to obviate or at least alleviate the problems encountered in prior art.

SUMMARY OF INVENTION

It is the primary objective of the present invention to provide an inexpensive tricycle.

To achieve the foregoing objectives, the tricycle includes a frame, a front fork connected to the frame, two rear forks each comprising a shank connected to the frame and two prongs extending from the shank, a front wheel rotationally connected to the front fork, two rear wheels each rotationally connected to the prongs of a corresponding one of the rear forks, and a steering mechanism connected to a selected one of the rear forks. There is a distance between an axis of the shank of each of the rear forks and a vertical line in which a center of the corresponding rear wheel rests when the rear wheels are laid on the ground.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
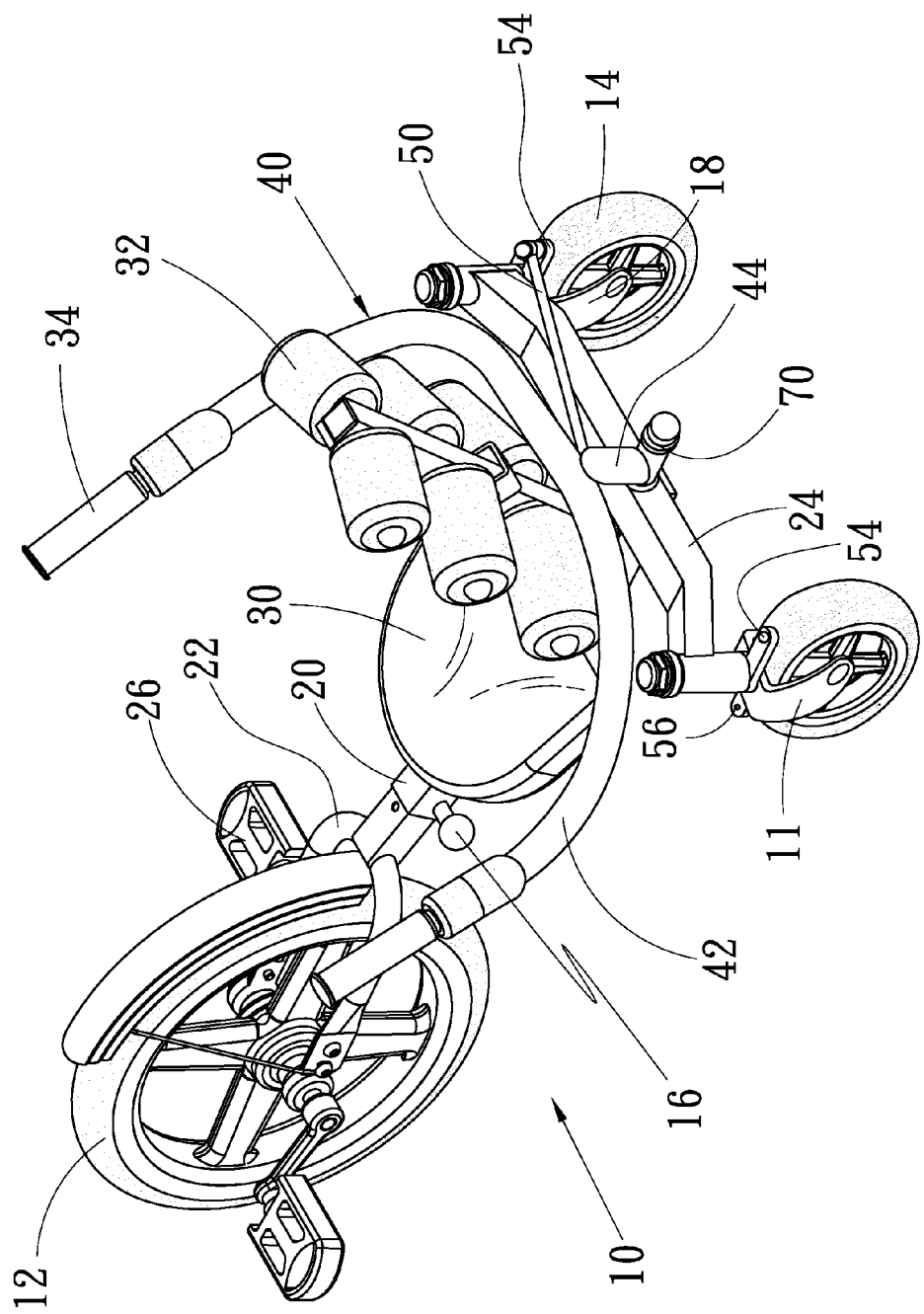
FIG. 1 is a perspective view of a tricycle according to the preferred embodiment of the present invention.

Referring to FIG. 1, an inexpensive tricycle includes a frame 10, a front wheel 12, two rear wheels 14 and a steering mechanism 40 according to the preferred embodiment of the present invention. Only one of the rear wheels 14 is connected to the steering mechanism 40. That is, the steering mechanism 40 is operable to directly steer only one of the rear wheels 14, while the other rear wheel 14 simply follows. The steering mechanism 40 is connected to the right rear wheel 14 in the preferred embodiment. However, the steering mechanism 40 can be connected to the left rear wheel 14 in another embodiment.

The frame 10 includes a longitudinal bar 20, a front fork 22, a crossbar 24 and two cylinders 25. The longitudinal bar 20 is a telescopic element under the control of a spring-biased pin 16. The front fork 22 inherently includes a shank and two prongs. The shank of the front fork 22 is telescopically connected to a front end of the longitudinal bar 20. A middle portion of the crossbar 24 is connected to a rear end of the longitudinal bar 20 by welding for example. Each of the cylinders 25 is connected to a corresponding end of the crossbar 24 by welding for example. Each of the cylinders 25 extends along a vertical axis 62 as illustrated in FIG. 3.

A seat 30 is connected to the longitudinal bar 20. A backrest 32 is connected to the longitudinal bar 20 or the seat 30. The seat 30 and the backrest 32 together form a chair.

The front wheel 12 is connected to the prongs of the front fork 22. Two cranks (not numbered) are connected to the front wheel 12. Two pedals 26 are connected to the cranks.

Figure 3:
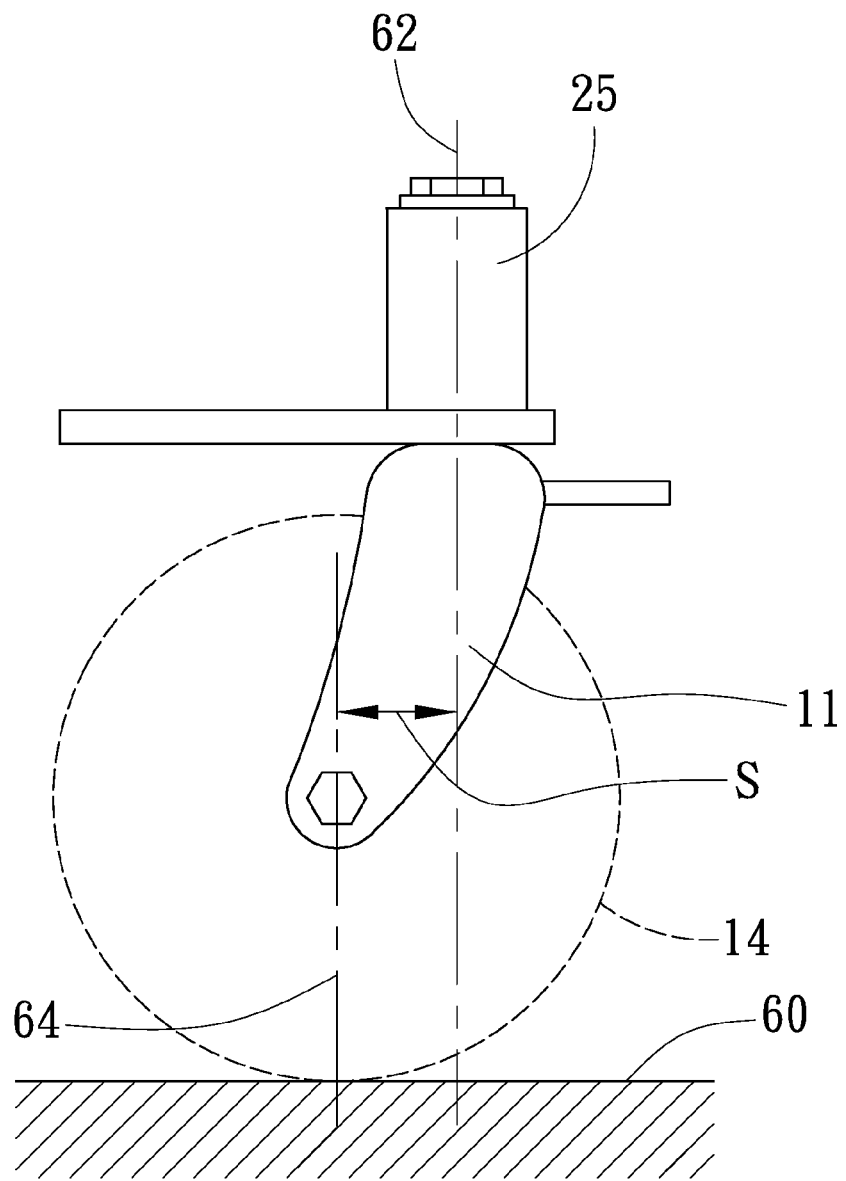
FIG. 3 is a partial left side view of the tricycle shown in FIG. 1.

Referring to FIG. 3, the left rear wheel 14 is connected to two prongs of a left rear fork 11 by a left rear axle (not numbered). The left rear fork 11 further includes a shank rotationally inserted in the left cylinder 25. The left rear wheel 14 is laid on the ground 60 in operation. The shank of the left rear fork 11 extends along the vertical axis 62. The center of the left rear wheel 14 is located along a vertical line 64. The vertical axis 62 is separated from the vertical line 64 by a distance S. The distance S facilitates the automatic steering of the left rear wheel 14.

Figure 2:
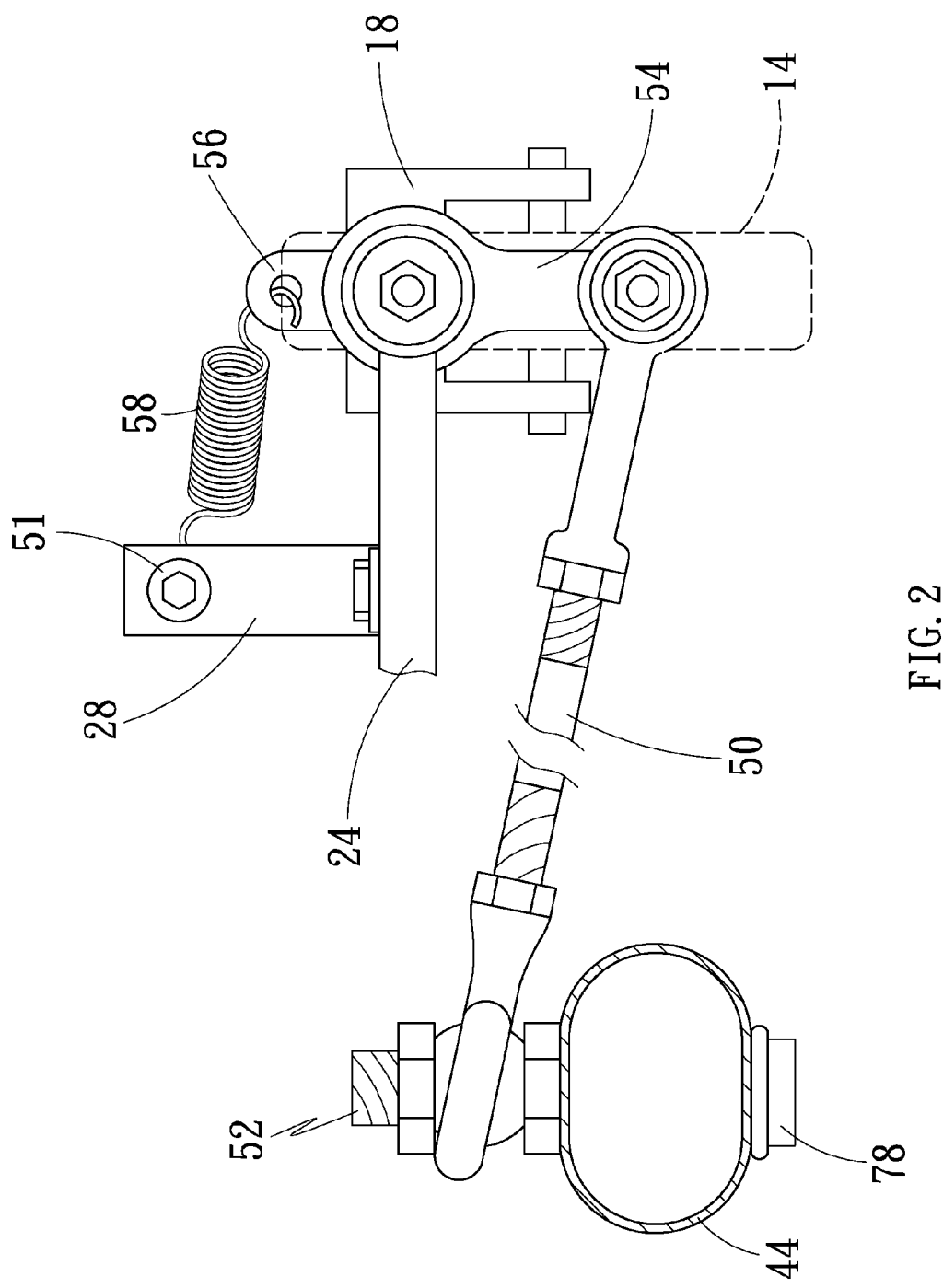
FIG. 2 is a partial top view of the tricycle shown in FIG. 1.

The right rear wheel 14 is connected to two prongs of a right rear fork 18 by a right rear axle (not numbered). The right rear fork 18 further includes a shank rotationally inserted in the right cylinder 25. The right rear fork 18 is like the left rear fork 11 except that the right rear fork 18 is connected to the steering mechanism 40. To this end, referring to FIG. 2, the right rear fork 18 further includes a rocker 54 connected to a rear side thereof by welding for example and a lug 56 connected to a front side thereof by welding for example.

The steering mechanism 40 includes a handlebar 42, an axle unit 70 and a connector 50. Two grips 34 are connected to two ends of the handlebar 42.

Figure 4:
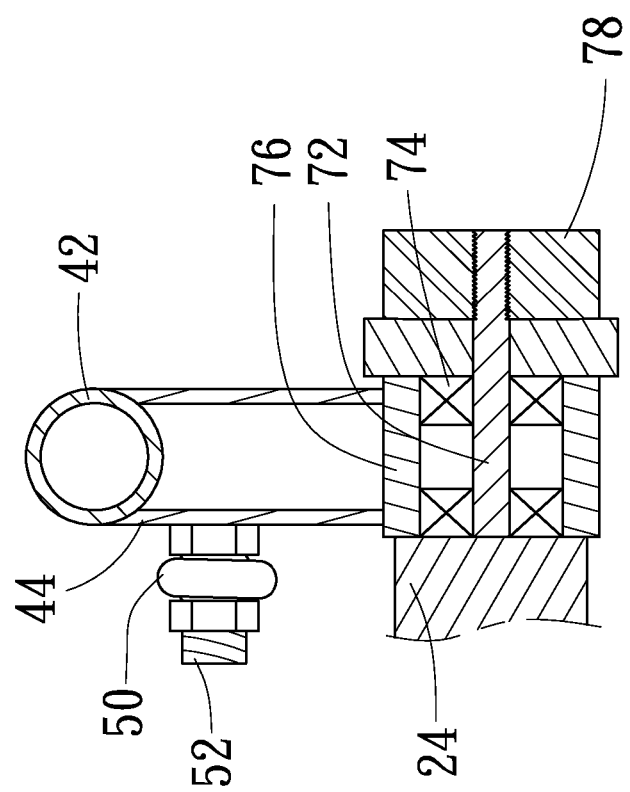
FIG. 4 is a partial cross-sectional view of the shown in FIG. 1.

Referring to FIG. 4, the axle unit 70 includes an axle 72, two bearings 74, a sleeve 76 and a nut 78. The axle 72 is connected to a rear side of the middle portion of the crossbar 24 by welding for example. The axle 72 extends perpendicular to the crossbar 24. The sleeve 76 is rotationally supported on the axle 72 by the bearings 74. The nut 78 includes a thread engaged with a thread formed on the axle 72.

The handlebar 42 is connected to the sleeve 76 by a swing element 44. A lower end of the swing element 44 connected to the sleeve 76 by welding for example. An upper end of the swing element 44 is connected to a middle portion the handlebar 42 by welding for example.

The connector 50 is made with an adjustable length between two ends. The first end of the connector 50 is connected to the swing element 44. A threaded bolt 52 is connected to the swing element 44. The first end of the connector 50 is connected to the threaded bolt 52 by a first universal joint (not numbered). The first universal joint includes a ball connected to the threaded bolt 52 and a ring provided around the ball at an end and connected to the connector 50 at another end. The second end of the connector 50 is connected to the rocker 54 by a second universal joint (not numbered). The second universal joint is similar to the first universal joint.

A tension spring 58 is provided between the lug 56 and a plate 28 connected to the crossbar 24. In specific, the tension spring 58 includes an end in the form of a hook connected to the lug 56 and another end connected to a threaded bolt 51 secured to the plate 28.

Figure 5:
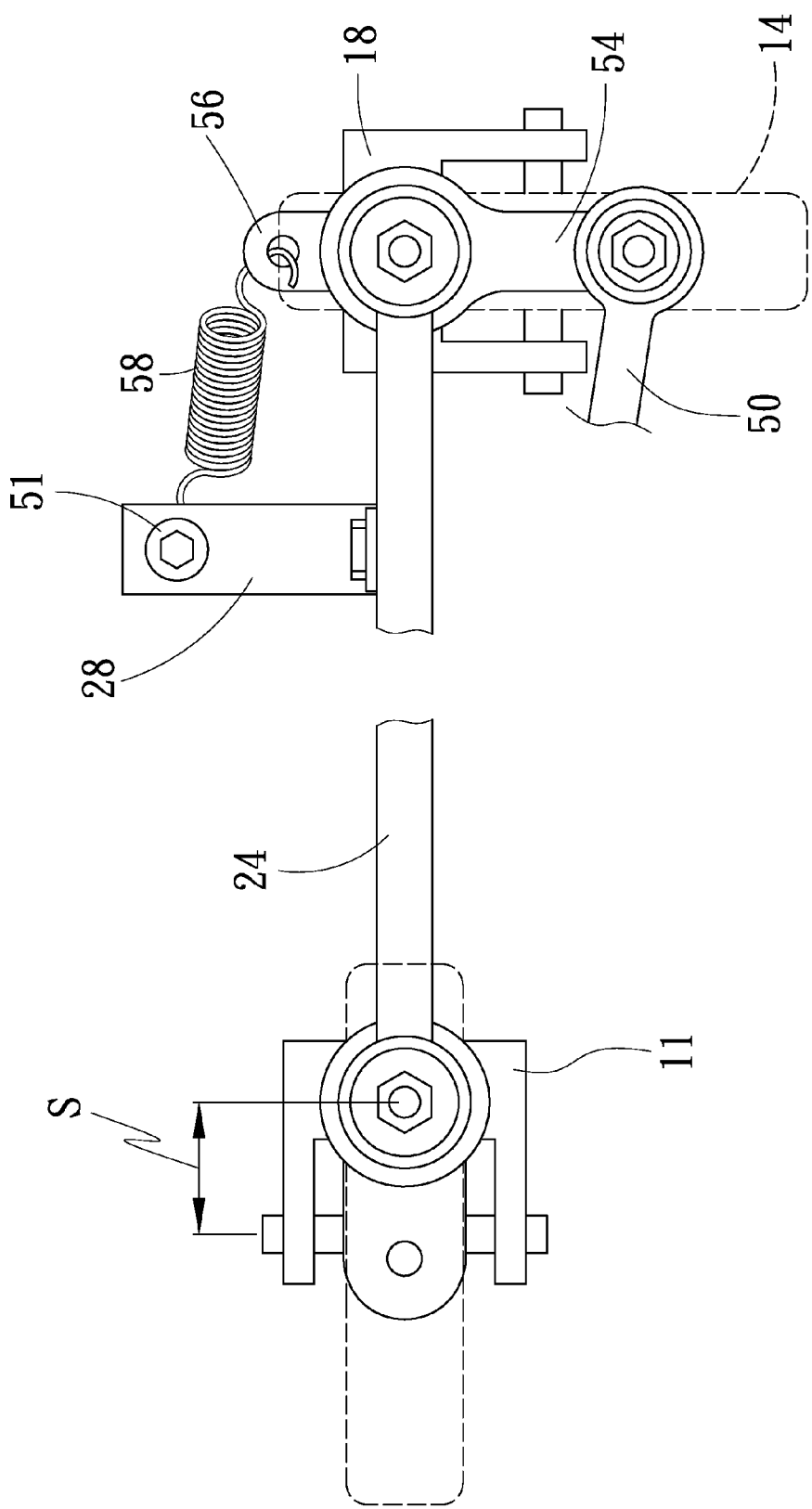
FIG. 5 is another partial top view of the tricycle shown in FIG. 1.

Referring to FIG. 5, the right rear wheel 14 is directly controlled by the steering mechanism 40. The left rear wheel 14 is allowed to go in any direction.

A downward force can be exerted on the right grip 34 to pivot the swing element 44 to the right. The swing element 44 pivots the rocker 54 to the right via the connector 50. Accordingly, the right rear fork 18 and the right rear wheel 14 are turned to the right. Hence, the tricycle is steered to the right. The left rear wheel 14 simply follows the right rear wheel 14 when the tricycle is moved.

A downward force can be exerted on the left grip 34 to pivot the swing element 44 to the left. The swing element 44 pivots the rocker 54 to the right via the connector 50. Accordingly, the right rear fork 18 and the right rear wheel 14 are turned to the left. Thus, the tricycle is steered to the left. The right rear wheel 14 simply follows the left rear wheel 14 when the tricycle is moved.

When both of the grips 34 are released from the downward force, the tension spring 58 turns the right rear fork 18 and the right rear wheel 14 back to the original position via the lug 56. Thus, the tricycle is ready for moving straight forward.

Figure 6:
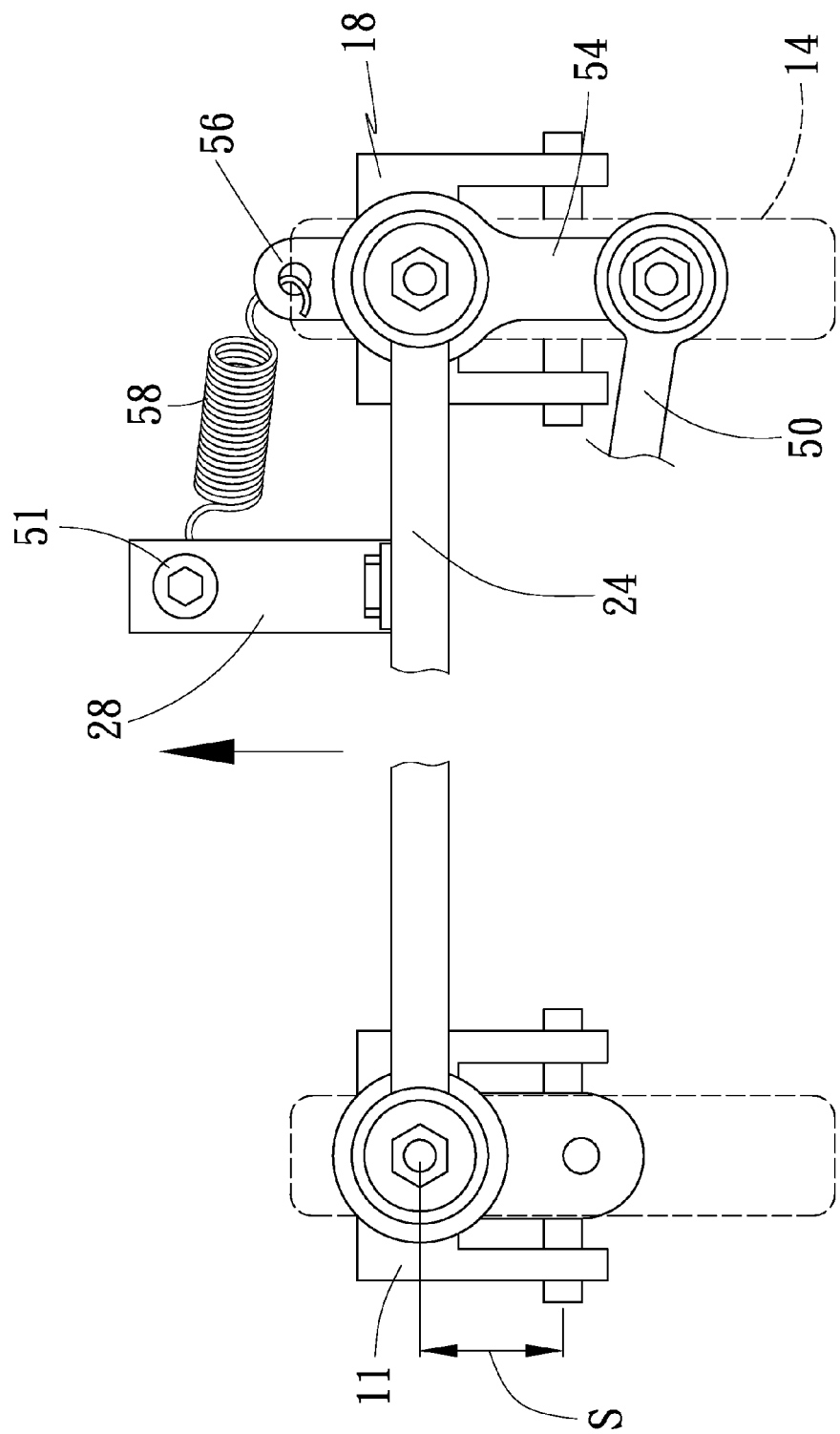
FIG. 6 is a partial top view of the tricycle in another position than shown in FIG. 5.

Referring to FIG. 6, the tricycle is moved forward. The left rear fork 11 is automatically pivoted so that the prongs thereof are located behind the crossbar 24.

Figure 7:
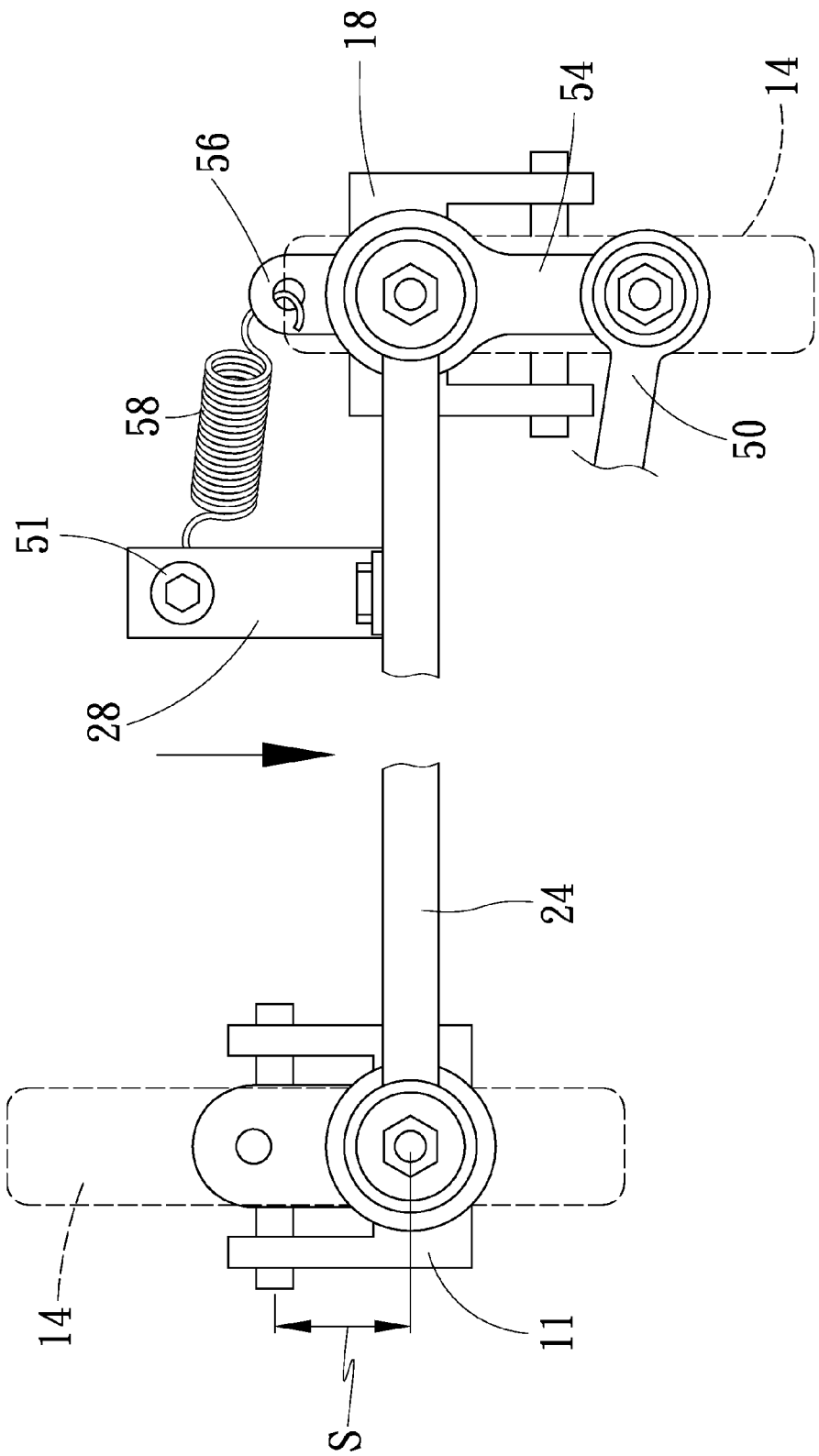
FIG. 7 is a partial top view of the tricycle in another position than shown in FIG. 6.

Referring to FIG. 7, the tricycle is moved backward. The left rear fork 11 is automatically pivoted so that the prongs thereof are located before the crossbar 24.

The connector 50, the threaded bolt 52, the rocker 54 and the first and second universal joints together form a linkage unit for connecting the steering mechanism 40 to the right rear fork 18. The tricycle is inexpensive for including only one linkage unit. The operation of the tricycle is smooth although only one of the rear wheels 14 is directly steered by the steering mechanism 40 because the other rear wheel 14 simply follows.

Advantageously, the axis of the shank of the left rear fork 11 extends in front of the axis of the left rear axle. That is, the axis of the shank of the left rear fork 11 does not intersect the axis of the left rear axle. The axis of the shank of the right rear fork 18 extends in front of the axis of the right rear axle. That is, the axis of the shank of the right rear fork 18 does not intersect the axis of the right rear axle. Therefore, the left rear fork 11 smoothly follows the right rear fork 18, which is directly steered by the steering mechanism 40.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A tricycle comprising:
    a frame;
    a front fork connected to the frame;
    two rear forks each comprising a shank connected to the frame and two prongs extending from the shank, wherein a selected one of the rear forks comprises a rocker on a rear side;
    a front wheel rotationally connected to the front fork;
    two rear wheels each rotationally connected to the prongs of a corresponding one of the rear forks, wherein there is a distance between an axis of the shank of each of the rear forks and a vertical line in which a center of the corresponding rear wheel rests when the rear wheels are laid on a floor; and
    a steering mechanism comprising:
        a handlebar;
        an axle connected to the frame;
        a sleeve rotationally supported on the axle;
        a swing element comprising a lower end connected to the sleeve, an upper end connected to the handlebar, and a middle portion; and
        a connector comprising an end pivotally connected to the middle portion of the swing element and another end pivotally connected to the rocker;
        wherein the handlebar is operable to pivot the rocker and the selected rear wheel to the right via the swing element and the connector to steer the tricycle to the right;
        wherein the handlebar is operable to pivot the rocker and the selected rear wheel to the left via the swing element and the connector to steer the tricycle to the left.

2. The tricycle according to claim 1, wherein the steering mechanism further comprises two grips each connected to a corresponding end of the handlebar.

3. The tricycle according to claim 1, further comprising two bearings for rotationally supporting the sleeve on the axle.

4. The tricycle according to claim 1, further comprising a spring provided between the frame and the selected rear fork to turn the selected rear wheel to an original direction.

5. The tricycle according to claim 4, wherein the selected rear fork comprises, on a front side, a lug connected to an end of the spring.

6. The tricycle according to claim 5, wherein the frame comprises a plate connected to another end of the spring.

7. The tricycle according to claim 1, wherein the connector is made with an adjustable length.

8. The tricycle according to claim 1, further comprising a left axle for connecting the left rear wheel to the prongs of the left rear fork and a right axle for connecting the right rear wheel to the prongs of the right rear fork, wherein the shank of the left rear fork is inserted in a left cylinder connected to the frame, wherein the shank of the right rear fork is inserted in a right cylinder connected to the frame, wherein an axis of the shank of the left rear fork extends in front of the axis of the left rear axle, wherein an axis of the shank of the right rear fork extends in front of the axis of the right rear axle.

* * * * *